United States Patent [19]
Zediker et al.

[11] Patent Number: 5,966,391
[45] Date of Patent: Oct. 12, 1999

[54] LONG CAVITY LASER SYSTEM INCLUDING FREQUENCY DOUBLING LONG CAVITY FIBER OPTIC LASER SYSTEM

[75] Inventors: Mark S. Zediker, Florissant; Robert A. Rice, Chesterfield, both of Mo.

[73] Assignee: McDonnell Douglas Corporation, St. Louis, Mo.

[21] Appl. No.: 08/884,033

[22] Filed: Jun. 27, 1997

[51] Int. Cl.[6] .................................................. H01S 3/10
[52] U.S. Cl. .................... 372/22; 372/93; 372/6; 372/27; 372/92; 372/108
[58] Field of Search ................... 372/94, 6, 92, 372/93, 18, 19, 21, 27, 102, 108

[56] References Cited

U.S. PATENT DOCUMENTS

| | | | |
|---|---|---|---|
| 5,497,386 | 3/1996 | Fontana | 372/6 |
| 5,504,771 | 4/1996 | Vahala et al. | 372/6 |

*Primary Examiner*—Leon Scott, Jr.
*Attorney, Agent, or Firm*—Westerlund & Powell, P.C.; Raymond H.J. Powell, Jr.; Robert A. Westerlund

[57] ABSTRACT

A polarization controlled laser system receiving a pump laser beam includes a long laser cavity for precluding mode hopping. Preferably, the long laser cavity is defined by first and second dichroic reflectors, a rare earth doped optical fiber disposed between the first and second dichroic reflectors for amplifying the pump laser beam to thereby produce an amplified laser beam, a polarization controller for controlling polarization of the amplified laser beam, and a polarization selector for selecting the polarization of the amplified laser beam. The polarization selector can include a polarizing optical fiber while the polarization controller advantageously may include a polarization maintaining optical fiber. Alternatively, the rare-earth doped optical fiber, the polarization controller, and the polarization selector are all formed from a single polarizing rare-earth doped optical fiber. The polarization controlled laser system may be converted to a frequency doubled polarization controlled laser system by adding a doubling crystal to the long laser cavity. Methods for generating polarization controlled laser beams using a long laser cavity formed from a rare-earth doped optical fiber are also described.

28 Claims, 5 Drawing Sheets

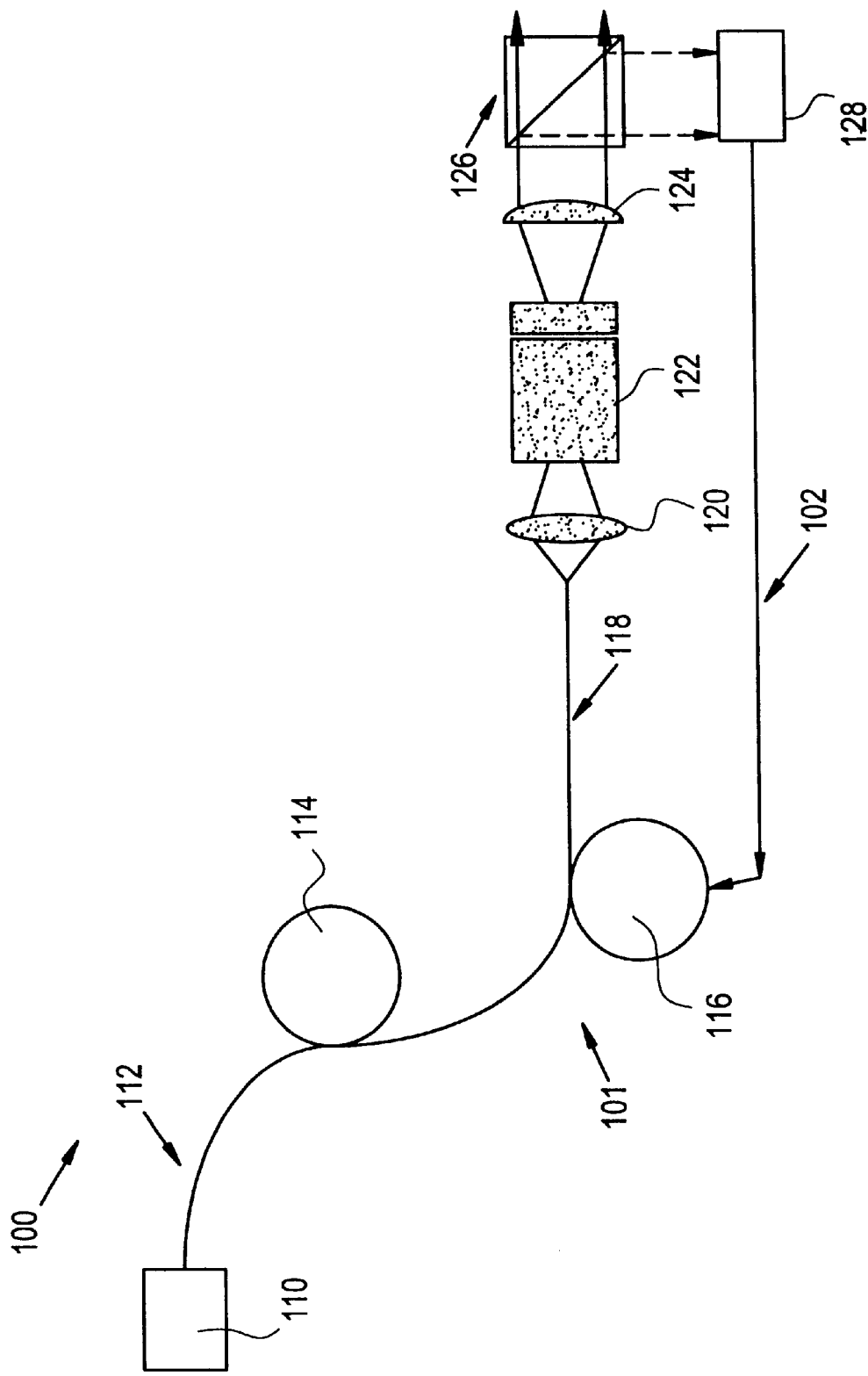

LONG CAVITY LASER SYSTEM INCLUDING FREQUENCY DOUBLING LONG CAVITY FIBER OPTIC LASER SYSTEM

BACKGROUND OF THE INVENTION

The present invention relates generally to long cavity laser systems. More specifically, the present invention relates to long cavity fiber optic laser systems, particularly frequency doubling long cavity laser systems using at least one optical fiber amplification component. Methods for generating polarization controlled laser beams using a long laser cavity formed from a rare-earth doped optical fiber are also disclosed.

At the present time, the development of new solid state media excited by high-power semiconductor lasers is an extremely active field. As a result of this work, compact systems which produce high quality beams in the near infrared have been developed. When harmonic generation techniques are utilized, compact lasers in the blue-green region of the spectrum are created. Such devices are presently of great interest because of their many applications, particularly in high density optical storage. U.S. Pat. Nos. 4,841,528, 4,887,270, 5,363,390, 5,390,210, 5,420,876, 5,450,429, and 5,479,431, which patents are incorporated herein by reference for all purposes, disclose typical frequency doubled laser systems capable of emitting a green laser light. It will be appreciated that the majority of these systems utilize short laser cavities; some of the disclosed systems utilize folded laser cavities.

A short laser cavity suffers from power fluctuations because of competition between the longitudinal modes within the laser cavity. It will be appreciated that in a short laser cavity, only a few longitudinal modes are operating at any given instant. The gain for any particular longitudinal mode is suppressed by cross saturation, both spatially and temporally, by power in other oscillating longitudinal modes. Since each longitudinal mode intersects and saturates a different volume of the gain medium, the gain for longitudinal modes that do not efficiently couple to the volume of the gain medium supporting the primary longitudinal mode can increase over time as inverted populations build up in those under-extracted volumes. In particular, the gain of such longitudinal modes can then actually exceed the gain of the then-current dominant longitudinal mode. When this happens, the frequency of the primary mode, and its frequency-doubled replica, jump to the new longitudinal mode, thereby causing a power spike and an attendant, subsequent power fluctuation. It will be appreciated that these fluctuations in the mode spectrum behave chaotically. Moreover, as mentioned above, these fluctuations in the mode spectrum are reflected in the amplitude spectrum of the frequency-doubled signal.

In contrast, a long laser cavity does not suffer from the above-described instability problems. Advantageously, a large number of modes oscillate in a long laser cavity and have sufficient overlap spatially that the gain in the laser rod is essentially homogenized to look approximately the same to all of the modes. The overall effect is that the amplitudes of the oscillating modes fluctuate less. In addition, if one longitudinal mode is overcome or quenched by another longitudinal mode, it is often only one of hundreds of lines oscillating in the long laser cavity. It will be appreciated that there is little or no effect on the total power emitted by the laser when one or more lines are quenched.

Thus, a frequency doubled laser using a medium such as Nd:YAG is highly unstable when a short laser cavity is used as the primary laser. The use of a relatively long laser cavity, i.e., long enough to permit stable operation, alleviates this instability problem.

One approach to building a frequency doubled laser using a long laser cavity was recently proposed by workers at the Semiconductor Laser Technology Branch of the Philips Laboratory (PL/LIDA), under funding from the U.S. Air Force. The proposed frequency doubled laser included a folded resonator design and used one or more discrete, end-pumped Nd:YAG rods, Different diode pump arrays were optically coupled to the rod(s) using either lenses or optical fibers.

The resonator was implemented as shown in FIG. 1A, wherein a single Nd:YAG rod (R1) is used as an active mirror in an inverse Z resonator configuration. The rod R1 was high-reflectivity (HR)-coated at 1064 nm and anti-reflection (AR)-coated at 808 nm on the rear (pump) surface and AR-coated at 1064 nm on the front surface. The resonator end mirrors (M1 and M3) were both HR-coated at 1064 nm; the end mirror in the frequency doubling leg (M3) was also HR-coated at 532 nm. The output coupler (M2) was HR-coated at 1064 nm on one surface and AR-coated at 532 nm on both surfaces.

It will be appreciated that the inverse Z resonator design allows implementation of an alternative two rod configuration as shown in FIG. 1B, wherein mirror M1 is replaced by a second Nd:YAG rod (R2). This allows pumping of each rod with a high-power laser diode, resulting in scaling to higher powers while alleviating gain media thermal loading. It will also be noted that three Nd:YAG rods (not shown) can be used in a Z-resonator when each rod is separately pumped. It should be noted that all of the inverse Z-resonator configurations employ an intracavity frequency doubling crystal (C1) made from a single piece of potassium titanyl phosphate (KTP). The KTP was mounted in a holder which allowed xyz translation, moderate xy tilt, and 360-degree rotation about the resonator axis.

As discussed briefly above, either conventional optics or optical fibers were used to couple the output of a laser diode bar or array to the Nd:YAG rod(s). In one instance, a four lens beam shaping train, i.e., three cylindrical lenses and one spherical lens, was used to focus the output of a laser diode array into the Nd:YAG rod. Later experiments used a fiber coupled diode array which was first collimated with a Melles Griot 8 mm lens and then focused into the Nd:YAG rod with a 31.7 mm spherical lens; both lenses were AR-coated at 830 mm.

It should be noted that although optical fibers were employed in the inverse Z resonator depicted in FIGS. 1A and 1B, the use of optical fibers in place of the inverse Z resonator did not occur to the system designers. From FIGS. 1A and 1B, it will also be appreciated that lengthening of the laser cavity by folding the cavity using reflectors requires careful alignment during the final stages of assembly. Moreover, the use of discrete elements dictates that a robust frequency doubled laser using a long laser cavity will require commensurate support elements, thus increasing the size and weight of the overall laser apparatus.

What is needed is a frequency doubled laser system which is compact and which provides excellent power stability. Additionally, what is needed is a frequency doubled laser system which is light in weight and which is not prone to alignment problems.

SUMMARY OF THE INVENTION

Based on the above and foregoing, it can be appreciated that there presently exists a need in the art for a polarization controlled, frequency doubled or undoubted, laser system which overcomes the above-described deficiencies. The present invention was motivated by a desire to overcome the drawbacks and shortcomings of the presently available technology, and thereby fulfill this need in the art.

An object according to the present invention is to provide a frequency doubled laser system having a relatively low noise operating characteristic. According to one aspect of the present invention, this object is achieved by employing a fiber laser in the frequency-doubled laser system.

Another object according to the present invention is to provide a frequency doubled laser system having a polarization feedback subsystem. It will be appreciated that the polarization feedback subsystem advantageously permits the frequency doubled laser system to operate without polarization maintaining, or polarizing fiber elements while providing a frequency doubled polarized output beam.

Still another object according to the present invention is to provide an undoubted frequency laser system including a polarization feedback subsystem. It will be appreciated that the polarization feedback subsystem allows the undoubled laser system to operate without polarization maintaining, or polarizing fiber elements while providing a polarized output beam.

Another object according to the present invention is to provide a frequency doubled laser system including fiber lasers. According to one aspect of the present invention, the fiber laser can be a polarization maintaining fiber laser. According to another aspect of the present invention, the fiber laser can be a non-polarization maintaining fiber laser.

Yet another object according to the present invention is to provide a frequency doubled laser system wherein a ring resonant fiber laser advantageously is used as a source for a frequency doubled laser system.

Another object according to the present invention is to provide a frequency doubled laser system having a laser cavity which is orders of magnitude longer than the maximum dimension of the frequency doubled laser system package.

Still another object according to the present invention is to provide a frequency doubled laser system having a robust construction. According to one aspect of the present invention, laser system components, including the long laser cavity, are self-aligning. According to another aspect of the present invention, the long laser cavity advantageously can be distributed throughout a large structure, such as an airframe, thereby permitting flexible arrangement of components into available void spaces or accommodating structures, e.g., structural members.

These and other objects, features and advantages according to the present invention are provided by a polarization controlled laser system receiving a pump laser beam comprising a long laser cavity for precluding mode hopping. Preferably, the long laser cavity is defined by first and second dichroic reflectors, a rare earth doped optical fiber disposed between the first and second dichroic reflectors for amplifying the pump laser beam to thereby produce an amplified laser beam, a polarization controller for controlling polarization of the amplified laser beam, and a polarization selector for selecting the polarization of the amplified laser beam.

According to a first aspect of the present invention, the polarization selector comprises a polarizing optical fiber. Moreover, the polarization controller advantageously may comprise a polarization maintaining optical fiber. According to another aspect of the present invention, the rare-earth doped optical fiber comprises a polarization maintaining, rare-earth doped optical fiber, the polarization controller also comprises the polarization maintaining, rare-earth doped optical fiber, and the polarization selector comprises a polarizing optical fiber. According to yet another aspect of the present invention, the rare-earth doped optical fiber, the polarization controller, and the polarization selector are all formed from a single polarizing rare-earth doped optical fiber.

These and other objects, features and advantages according to the present invention are provided by a frequency doubled polarization controlled laser system receiving a pump laser beam, including a long laser cavity for precluding mode hopping. Advantageously, the long laser cavity includes first and second dichroic reflectors, a rare earth doped optical fiber disposed between the first and second dichroic reflectors for amplifying the pump laser beam to thereby produce an amplified laser beam, a polarization controller for controlling polarization of the amplified laser beam, a polarization selector for selecting the polarization of the amplified laser beam, and a frequency doubling optical subsystem for converting the amplified laser beam into a frequency doubled laser beam. According to one aspect of the present invention, the polarization selector can include a polarizing optical fiber. Alternatively, the polarization selector can include a polarization sensitive beam splitter.

These and other objects, features and advantages according to the present invention are provided by a frequency doubled polarization controlled laser system receiving a pump laser beam, comprising a long laser cavity for precluding mode hopping, wherein the long laser cavity includes:

a first dichroic reflector for transmitting the pump laser beam and for reflecting an amplified laser beam;

a rare earth doped optical fiber for amplifying the pump laser beam to thereby produce the amplified laser beam;

a polarization controller for controlling polarization of the amplified laser beam;

a polarization selector for selecting the polarization of the amplified laser beam;

a frequency doubling device for converting the amplified laser beam into a frequency doubled laser beam; and a second dichroic reflector for transmitting the frequency doubled laser beam and for reflecting the amplified laser beam.

These and other objects, features and advantages according to the present invention are provided by a frequency doubled polarization controlled laser system receiving a pump laser beam and having a long laser cavity for precluding mode hopping. Preferably, long laser cavity includes a first dichroic reflector for transmitting the pump laser beam and reflecting an amplified laser beam, a single polarizing rare earth doped optical fiber for amplifying the pump laser beam to thereby produce the amplified laser beam, for controlling polarization of the amplified laser beam, and for selecting the polarization of the amplified laser beam, a frequency doubler for converting the amplified laser beam into a frequency doubled laser beam, and a second dichroic reflector for transmitting the frequency doubled laser beam and reflecting the amplified laser beam.

These and other objects, features and advantages according to the present invention are provided by a method for generating a frequency doubled polarization controlled laser beam responsive to a pump laser beam in a laser system having a long laser cavity precluding mode hopping and including at least one rare-earth doped optical fiber producing a gain. Preferably, the method includes steps for:

selectively transmitting the pump laser beam into a first end of the long laser cavity while reflecting an amplified laser beam at the first end of the long laser cavity;

amplifying the pump laser beam to thereby produce the amplified laser beam;

selecting a polarization characteristic of the amplified laser beam and controlling the polarization state of the amplified laser beam to thereby provide a polarization controlled laser beam;

converting the polarization controlled laser beam into a frequency doubled laser beam; and selectively transmitting the frequency doubled laser beam out of a second end of the long laser cavity while reflecting the polarization controlled laser beam at the second end of the long laser cavity.

These and other objects, features and advantages according to the present invention are provided by a method for generating a polarization controlled laser beam responsive to a pump laser beam in a laser system having a long laser cavity precluding mode hopping and including at least one rare-earth doped optical fiber producing a gain. Preferably, the method includes steps for:

selectively transmitting the pump laser beam into a first end of the long laser cavity while reflecting an amplified laser beam at the first end of the long laser cavity;

amplifying the pump laser beam to thereby produce the amplified laser beam;

selecting a polarization characteristic of the amplified laser beam and controlling the polarization state of the amplified laser beam to thereby provide a polarization controlled laser beam; and selectively transmitting the polarization controlled laser beam out of a second end of the long laser cavity while reflecting the amplified laser beam at the second end of the long laser cavity.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 2 is a high level partially block, partially schematic diagram of a first preferred embodiment of a long laser cavity frequency doubled laser system according to the present invention;

DETAILED DESCRIPTION OF THE PREFERRED EMBODIMENTS

Figure 1A:
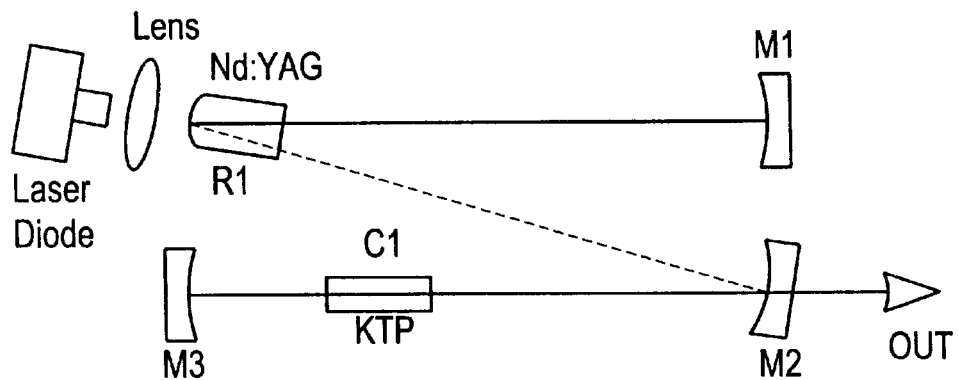
FIGS. 1A and 1B are alternative arrangements of a proposed frequency doubled laser system having a folded laser cavity.
Figure 1B:
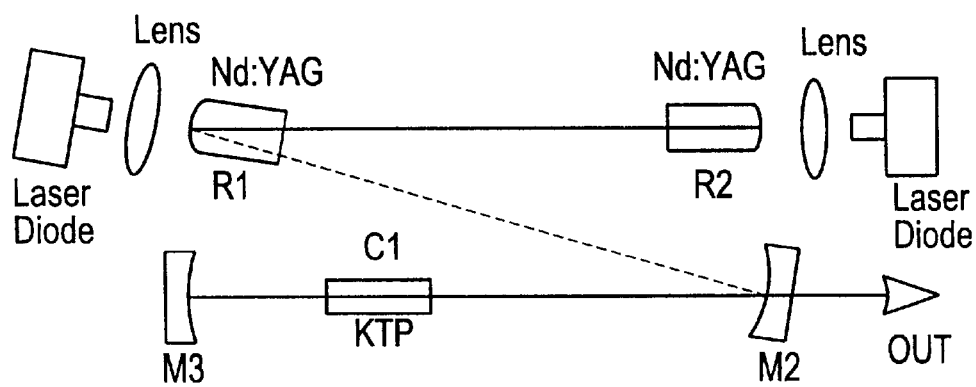

The above-mentioned objects and advantages according to the present invention are provided by using a long cavity length in the primary laser of the laser system. Those of ordinary skill in the art will appreciate that, in a conventional linear or folded laser cavity system, this would make an exemplary frequency doubled laser system a large system. However, the present invention provides a long laser cavity while allowing the actual laser system to be very compact. This aspect of the present invention advantageously can be achieved by using optical fiber components, to the maximum extent possible, in forming the long laser cavity.

A first preferred embodiment according to the present invention will now be described with reference to FIG. 2, which depicts a frequency doubled laser system 100 including a long laser cavity 101 and a polarization feedback subsystem 102. The frequency doubled laser system 100 includes a laser diode pump subsystem 110, which advantageously can include a single laser diode, a laser diode bar or a laser diode array, and associated coupling optics. The coupling optics included in laser diode pump subsystem 110 advantageously couple the pump laser beam into a rare earth doped optical fiber amplifier 114 via an optical reflecting device 112 forming one end of the long laser cavity 101 employed in the frequency doubled laser system 100 according to the present invention. It should be mentioned that the other end of the long laser cavity 101 terminates, in an exemplary case, at an output coupler element 124, as discussed in greater detail below.

Preferably, the optical reflecting device 112 is a device for preventing optical feedback to the laser diode pump subsystem. In an exemplary case, the optical reflecting device advantageously can be a reflecting mirror, e.g., a high reflectivity mirror. Most preferably, the optical reflecting device 112 is an integral Bragg grating reflector mirror. It should be noted that such integral Bragg grating reflector mirrors are known to those of ordinary skill in the art, as evidenced by the article entitled *Photoinduced Bragg Gratings in Optical Fibers*, which article appeared in the February, 1994, issue of OPTICS & PHOTONICS NEWS at pages 8–14, and which article is incorporated by reference for all purposes. It will be appreciated that the integral Bragg grating reflector mirror advantageously can be used as a frequency selector, e.g., as a notch filter, within the long laser cavity 101 of the frequency doubled laser system 100.

In an exemplary case, the optical fiber used in fabrication of the rare earth doped fiber amplifier 114 is doped with a rare earth element such as Nd. It should be mentioned that the optical fiber advantageously can be a single transverse mode core fiber or a dual core fiber as described in commonly assigned, copending U.S. patent applications, Ser. Nos. 08/471,870 and 08/661,474, which applications are incorporated herein by reference for all purposes. Preferably, the rare earth doped optical fiber is formed into a number of concentric loops, i.e., a coil. In an exemplary case, the coil accounts for a major portion of the length of the long laser cavity 101 used in the frequency doubled laser system 100. In other words, the frequency doubled laser system 100 advantageously includes a coiled, long laser cavity 101, as discussed in greater detail immediately below.

Still referring to FIG. 2, the coiled long laser cavity 101 includes a both a polarization controller 116 and a polarization selector 118. In the exemplary case under discussion, the polarization controller 116 advantageously can be an electronically controlled polarization stabilization system for a non-polarization maintaining fiber. Preferably, the polarization controller 116 includes a second optical fiber coil, which coil advantageously can be rotated about the axis of the optical fiber used in forming the polarization controller 116. Preferably, an electro-mechanical or electromotive device (not shown) is employed in positioning the coil of the polarization controller 116 at an optimum position in response to an electrical signal, the generation of which will be discussed in greater detail below. Alternatively, the polarization controller 116 can be fabricated using, for example, electrically stimulated liquid or LiNb crystals. It will be appreciated that these, and other types of polarization controllers, are well known to those of ordinary skill in the art; further details will not be furnished in the interest of brevity.

Preferably, the polarization selector 118 can be a section of polarizing optical fiber. It should be noted that polarizing optical fiber is commercially available from the 3M Company under various names, e.g., polarizing single-mode fiber (PZ series). It should be mentioned that the polarization controller 116 and the polarization selector 118 cooperate with one another to optimize the polarized output beam produced in the long laser cavity 101 of the frequency doubled laser system 100, i.e., the polarization selector 118 selects and guides one and only one polarization of light in the long laser cavity 101 while the polarization controller 116 provides polarization feedback control of the laser light in the long laser cavity 101.

Referring to FIG. 2, the frequency doubling function advantageously can be provided by a doubling crystal 122, which crystal advantageously can be any nonlinear crystal such as Lithium Niobate or potassium titanyl phosphate (KTP). It will be appreciated that polarized laser light is coupled into the doubling crystal 122 by focusing optical element 120 while frequency doubled laser light is coupled to downstream optical elements, discussed immediately below, by output coupler element 124.

In the exemplary case illustrated in FIG. 2, feedback control of the frequency doubled laser beam is achieved using a polarization sensitive beam splitter 126, which passes p polarized light to downstream optical elements while providing s polarized light to a detector element 128. Detector 128 advantageously generates the feedback electrical signal provided to polarization controller 116, as discussed above.

In summary, the first preferred embodiment according to the present invention illustrated in FIG. 2 includes a long laser cavity 101 formed by optical reflector 112, e.g., a HR mirror or integral Bragg grating reflector mirror, near the diode laser pump 10 and an output coupler 124. Preferably, each of these elements is dichroic. The optical reflector 112 advantageously can pass 808 nm laser light and reflect 1060 nm laser light while the output coupler 124 transmits 532 nm (doubled 1060 nm laser light) and reflects 1060 nm laser light. Preferably, the doubling crystal 122 operates in a single pass mode, making KTP the best choice. It will be appreciated that the polarization of the laser system 100 output is controlled by straining the optical fiber in a loop of the fiber that creates a quarter waveplate while the waveplate is controlled by rotating the optical fiber loop, i.e., the polarization controller 116, about the axis of the fiber. It will also be noted that, as discussed above, the detector 128 senses the intensity of the s polarized 532 nm light exiting the laser system 100 and maximizes the intensity of the output laser light by adjusting the polarization of the 1060 nm laser light. As previously mentioned, one section of the optical fiber advantageously may be a polarizing section acting as polarization selector 118, which enables the fiber laser to operate in a single polarization state.

Figure 3:
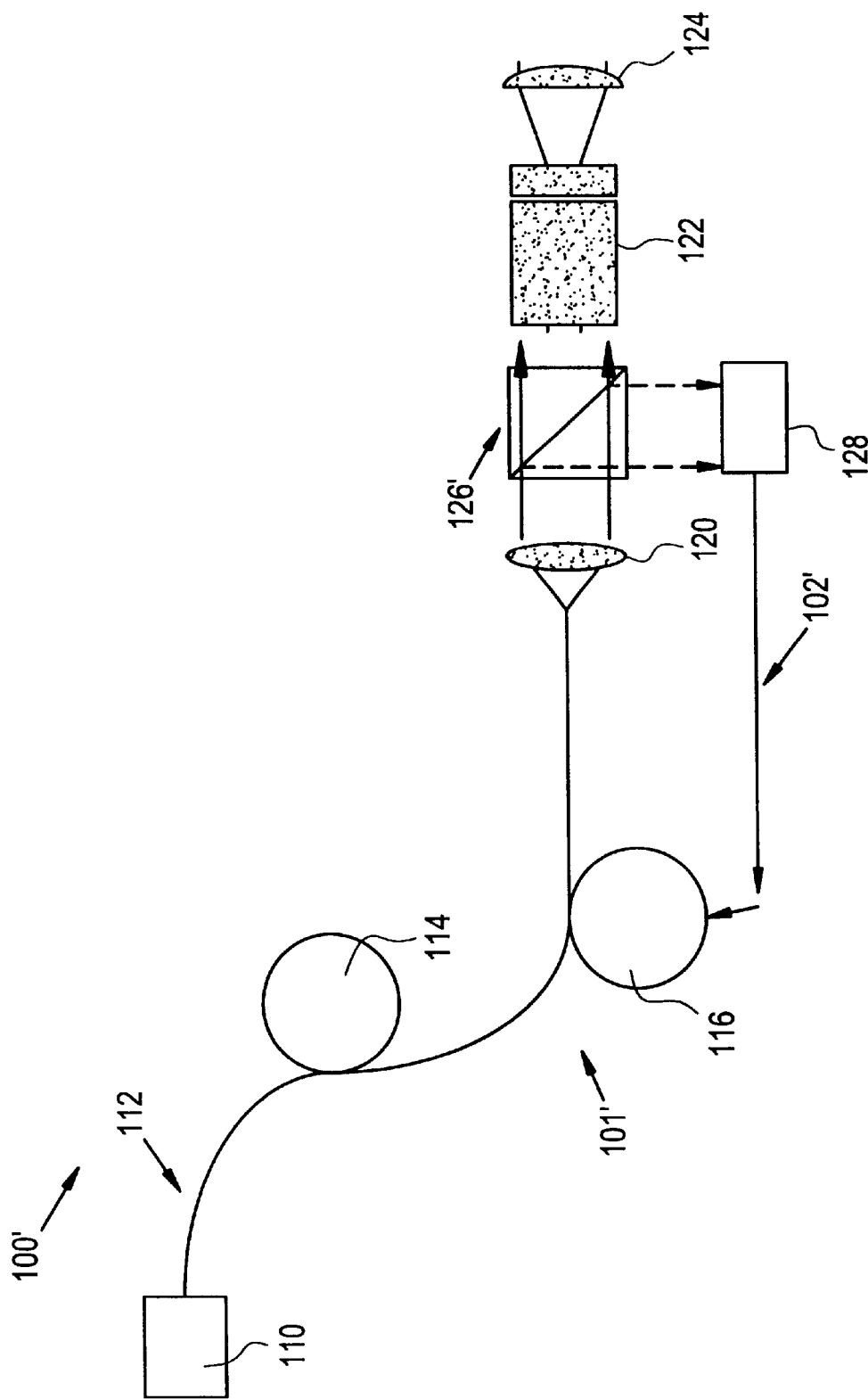
FIG. 3 is an alternative, second preferred embodiment of the long laser cavity frequency doubled laser system according to the present invention, in contrast to the first embodiment pictured in FIG. 2.

A second preferred embodiment of the present invention is illustrated in FIG. 3 and is formed by an alternative arrangement of the elements employed in the frequency doubled laser system 100. The primary difference between the first and second preferred embodiments according to the present invention lies in the placement of the polarization sensitive beam splitter, generally denoted 126. In contrast with the placement of the beam splitter 126 outside of the long laser cavity 101, as shown in FIG. 2, the polarization beam splitter 126' advantageously is disposed within the long laser cavity 101' in the alternative embodiment illustrated in FIG. 3. It should be mentioned that the polarization selector 118 employed in the frequency doubled laser system 100 of FIG. 2 advantageously can be omitted from the frequency doubled laser system 100' of FIG. 3, since the polarization sensitive beam splitter 126' provides the polarization selecting function when beam splitter 126' is disposed withing the long laser cavity 101'. It will also be appreciated that locating the polarization sensitive beam splitter 126' within the long laser cavity 101' permits direct measurement of the laser light in the long laser cavity 101'.

Figure 4:
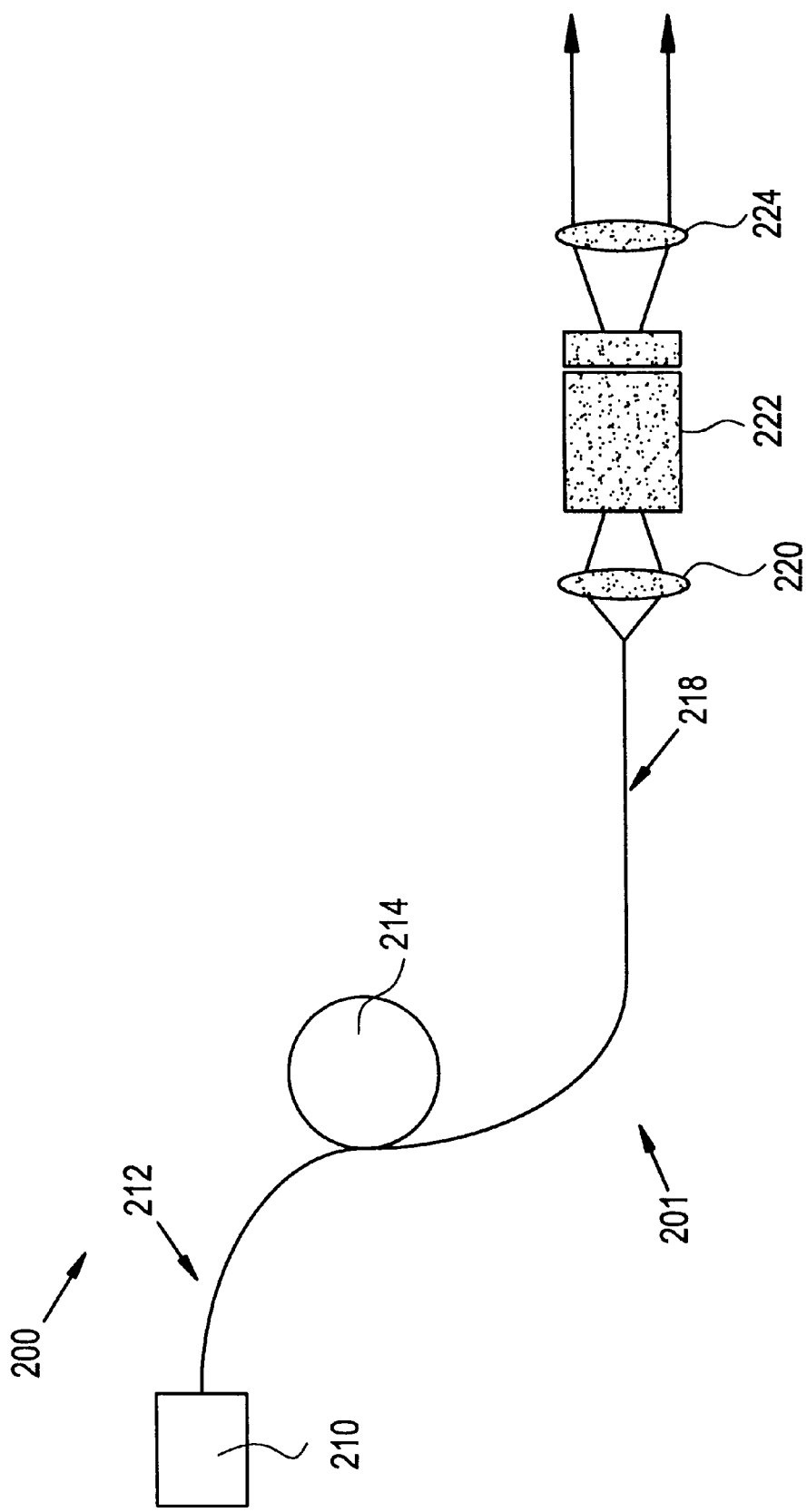
FIG. 4 is a high level partially block, partially schematic diagram of a third preferred embodiment of a long laser cavity frequency doubled laser system according to the present invention.

A third preferred embodiment of the frequency doubled laser system 200 according to the present invention is illustrated in FIG. 4. Advantageously, this preferred embodiment is composed almost completely of passive elements, the laser diode pump subsystem 210 being the noted exception. Thus, optical elements 212, 220, 222, and 224 are substantially identical to the optical elements illustrated in FIGS. 2 and 3 and described in detail above. Since a description of these elements has previously been provided, additional discussion of these elements and the functions provided thereby will be omitted from the discussion of FIG. 4. It will also be noted that the feedback subsystem 102, i.e., the polarization controller 116, the polarization sensitive beam splitter 126 and the detector 128 have been omitted from the third preferred embodiment of the present invention.

Preferably, the simplified frequency doubled laser system 200 of FIG. 4 includes a polarization maintaining rare-earth-doped (PM-RED) fiber forming a laser amplifier 214. Since the rare earth doped fiber of laser amplifier 214 is polarization maintaining, it is necessary to include a polarization selector 218, which preferably can be a polarizing section of optical fiber, as discussed above, or an external polarizer (not shown). In an alternative configuration of the third embodiment according to the present invention, the optical fiber employed in laser amplifier 214 advantageously can be a polarizing rare-earth doped (P-RED) fiber, permitting the polarization selector 218 to be omitted from the frequency doubled laser system 200.

It should be mentioned here that both the polarizing and polarization maintaining fibers are commercially available; such fibers advantageously can be procured in matching diameters to facilitate the splicing of the PM-RED and the polarization selector fibers to one another in the conventional manner. Additionally, the polarizing and polarization-maintaining fibers advantageously can be spliced onto a section of rare-earth-doped optical fiber so as to collectively provide the necessary system gain while simultaneously providing discrimination between the losses of the p and s polarization such that only the polarization matched to the nonlinear crystal oscillates. It should also be mentioned that a polarizing rare-earth doped optical fiber has heretofore never been suggested; thus, polarization controlled laser systems using such an optical fiber have never been proposed.

Figure 5:
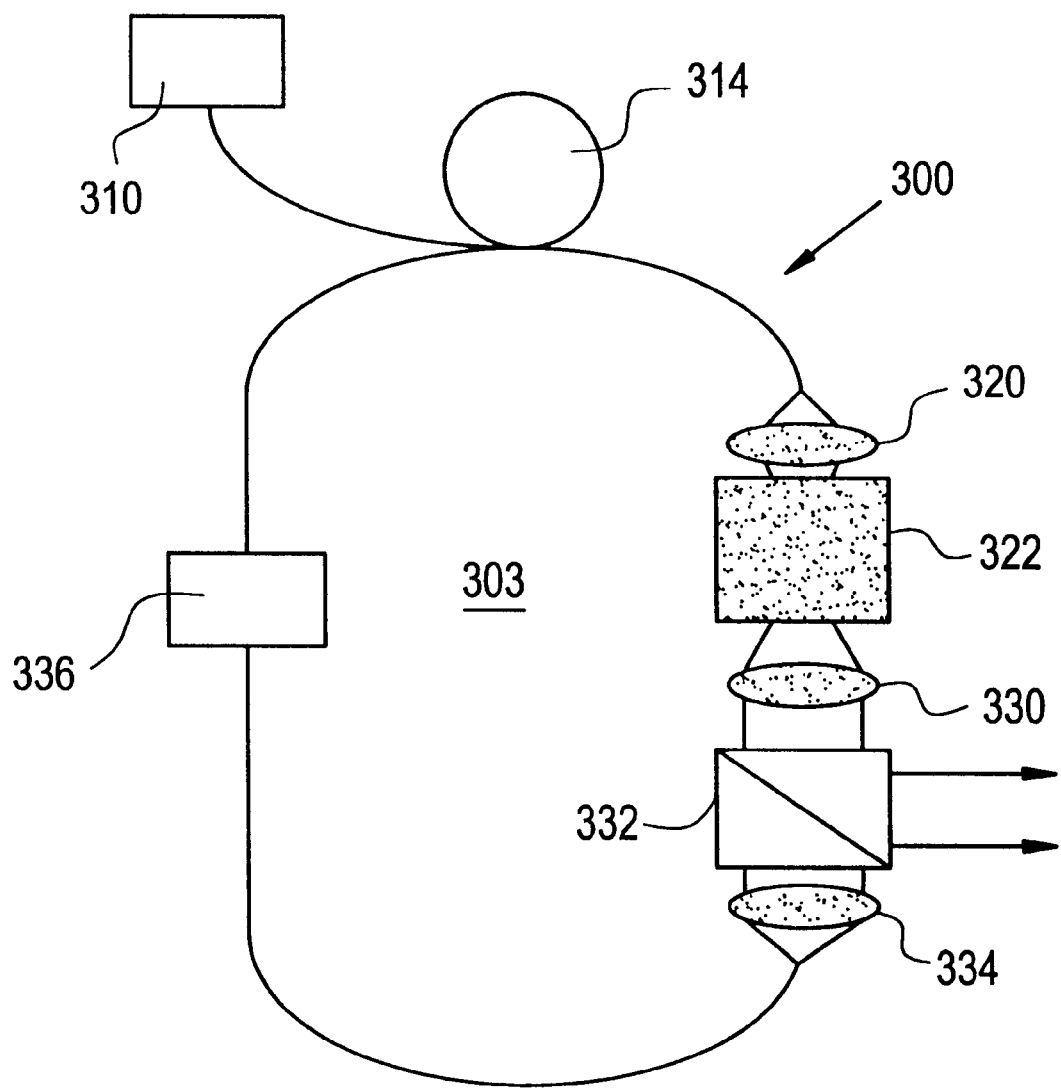
FIG. 5 a high level partially block, partially schematic diagram of a long laser cavity frequency doubled ring laser system, which constitutes a fourth preferred embodiment of the present invention.

A fourth preferred embodiment according to the present invention, i.e., a frequency doubled ring laser system 300, is illustrated in FIG. 5. The frequency doubled ring laser system includes a laser diode pump subsystem 310 and a ring subsystem 303. The ring subsystem advantageously can include a rare-earth doped optical fiber forming a laser amplifier 314, a focusing lens 320, a doubling crystal 322, a collimating lens 330, a dichroic filter 332, i.e., a dichroic beam splitter, a focusing element 334 and an optical isolator 336. It will be appreciated that optical isolator 336 is included in the ring laser cavity so as to prevent bidirectional circulation of laser light in the ring-shaped long laser cavity 303.

Preferably, the frequency doubled ring laser system 300 illustrated in FIG. 5 advantageously includes one of the following combination of elements so as to permit polarization control upstream of the doubling crystal 322:

(1) a polarization controller, a polarization-sensitive beam splitter, and a detector;
(2) a PM-RED fiber and a polarization selector; or
(3) a P-RED fiber.

When polarization control is desired but a frequency doubled laser output beam is unnecessary, fifth through eighth preferred embodiments of the present invention can be formed by modifying the first through fourth preferred embodiments, respectively, by the simple expedient of omitting an appropriate one of the doubling crystals 122, 222 or 322. It will be appreciated that consequential adjustments to the passive elements surrounding doubling crystals 122, 222 or 322 will be required to compensate for omission of the doubling crystals; such adjustments are known to be well within the skill of one of ordinary skill in the art and will not be further described. Additional preferred embodiments according to the present invention advantageously can be formed by selecting various components from FIGS. 2–5 and using those selected components to form yet another frequency doubled or undoubted laser system.

It should be mentioned that the primary applications of the long cavity laser system according to the present invention include: printers; laser target designators; semiconductor device repair; laser projectors; laser light shows; and laser levelers. It should also be mentioned that this list is exemplary and not exhaustive; other applications will occur to one of ordinary skill in the art and all such additional applications are within the scope of the present invention.

From the discussion above, it will be appreciated that the frequency doubled or undoubted laser system according to the present invention provides a laser system having a laser cavity which is orders of magnitude longer than the maximum dimension of the laser system itself. Moreover, the polarization controlled laser system embodiments according to the present invention are uniformly robust. It will be appreciated that fabrication of the polarization controlled laser systems from optical fiber elements, to the maximum extent possible, results in laser systems that are virtually self-aligning. Additionally, the long laser cavity, which preferably includes a single coil of rare-earth dope optical fiber acting as an amplification device but which may include several such optical fiber coils, advantageously can be distributed throughout a large structure, such as an airframe, thereby permitting flexible arrangement of components into available void spaces or accommodating structures.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A polarization controlled laser system receiving a pump laser beam, comprising:
   a long laser cavity which suppresses output power fluctuations, said long laser cavity including:
   first and second dichroic reflectors;
   a rare earth doped dual core optical fiber disposed between said first and second dichroic reflectors which amplifies the pump laser beam to thereby produce an amplified laser beam;
   a polarization controller which controls polarization of said amplified laser beam; and
   a polarization selector which selects said polarization of said amplified laser beam.

2. The polarization controlled laser system as recited in claim 1, wherein said polarization selector comprises a polarizing optical fiber.

3. The polarization controlled laser system as recited in claim 1, wherein said polarization controller comprises a polarization maintaining optical fiber.

4. The polarization controlled laser system as recited in claim 1, wherein:
   said polarization controller comprises a polarization maintaining optical fiber; and
   said polarization selector comprises a polarizing optical fiber.

5. The polarization controlled laser system as recited in claim 1, wherein:
   said long laser cavity is a ring-shaped long laser cavity, and further comprises:
   an output beam splitter which produces an output laser beam; and
   an optical isolator which prevents bidirectional propagation of said amplified laser beam within the ring-shaped long laser cavity.

6. The polarization controlled laser system as recited in claim 1, wherein said rare-earth doped dual core optical fiber, said polarization controller, and said polarization selector collectively comprise a polarizing rare-earth doped optical fiber.

7. The polarization controlled laser system as recited in claim 1, wherein said polarization controller comprises a quarter wavelength loop of optical fiber, said loop being rotatable about an axis of said optical fiber responsive to a control signal.

8. The polarization controlled laser system as recited in claim 7, further comprising:
   a polarization sensitive beam splitter producing a detectable polarized laser beam responsive to said amplified laser beam; and
   a detector which generates said control signal responsive to said detectable polarized laser beam.

9. The polarization controlled laser system as recited in claim 7, wherein:
   said long laser cavity further comprises a polarization sensitive beam splitter producing a detectable polarized laser beam responsive to said amplified laser beam; and
   the polarization controlled laser system further comprises a detector disposed outside of said long laser cavity which generates said control signal responsive to said detectable polarized laser beam.

10. The polarization controlled laser system as recited in claim 1, wherein said polarization selector comprises a polarization sensitive beam splitter.

11. The polarization controlled laser system as recited in claim 1, wherein at least one of said first and second dichroic reflectors comprises an integral Bragg grating reflector mirror.

12. The polarization controlled laser system as recited in claim 1, wherein:
   the polarization controlled laser system is a frequency doubled polarization controlled laser system; and
   said long laser cavity further comprises a frequency doubling optical subsystem which converts said amplified laser beam into a frequency doubled laser beam.

13. A frequency doubled polarization controlled laser system receiving a pump laser beam, comprising:
   a long laser cavity which suppresses output power fluctuations, said long laser cavity, including:
      first and second dichroic reflectors;
      a rare earth doped dual core optical fiber disposed between said first and second dichroic reflectors which amplifies the pump laser beam to thereby produce an amplified laser beam;
      a polarization controller which controls polarization of said amplified laser beam;
      a polarization selector which selects said polarization of said amplified laser beam; and
      a frequency doubling optical subsystem which converts said amplified laser beam into a frequency doubled laser beam.

14. The frequency doubled polarization controlled laser system as recited in claim 13, wherein said polarization selector comprises a polarizing optical fiber.

15. The frequency doubled polarization controlled laser system as recited in claim 13, wherein said polarization controller comprises a polarization maintaining optical fiber.

16. The frequency doubled polarization controlled laser system as recited in claim 13, wherein:
   said polarization controller comprises a polarization maintaining optical fiber; and
   said polarization selector comprises a polarizing optical fiber.

17. The frequency doubled polarization controlled laser system as recited in claim 13, wherein said long laser cavity is a ring-shaped long laser cavity, and further comprises:
   a dichroic beam splitter which produces an output laser beam responsive to said frequency doubled laser beam; and
   an optical isolator which prevents bidirectional propagation of said amplified laser beam within said ring-shaped long laser cavity.

18. The frequency doubled polarization controlled laser system as recited in claim 13, wherein said rare-earth doped dual core optical fiber, said polarization controller, and said polarization selector collectively comprise a polarizing rare-earth doped optical fiber.

19. The frequency doubled polarization controlled laser system as recited in claim 13, wherein said polarization controller comprises a quarter wavelength loop of optical fiber, said loop being rotatable about an axis of said optical fiber responsive to a control signal.

20. The frequency doubled polarization controlled laser system as recited in claim 19, further comprising:
   a polarization sensitive beam splitter producing a detectable polarized laser beam responsive to said amplified laser beam; and
   a detector which produces said control signal responsive to said detectable polarized laser beam.

21. The frequency doubled polarization controlled laser system as recited in claim 19, wherein:
   said long laser cavity further comprises a polarization sensitive beam splitter producing a detectable polarized laser beam responsive to said amplified laser beam; and
   the frequency doubled polarization controlled laser system further comprises a detector disposed outside of said long laser cavity which produces said control signal responsive to said detectable polarized laser beam.

22. The frequency doubled polarization controlled laser system as recited in claim 13, wherein said polarization selector comprises a polarization sensitive beam splitter.

23. The frequency doubled polarization controlled laser system as recited in claim 13, wherein at least one of said first and second dichroic reflectors comprises an integral Bragg grating reflector mirror.

24. The frequency doubled polarization controlled laser system as recited in claim 13, wherein said frequency doubling optical subsystem comprises a doubling crystal.

25. A frequency doubled polarization controlled laser system receiving a pump laser beam, comprising:
   a long laser cavity which suppresses output power fluctuations, said long laser cavity, including:
      first dichroic reflector means for transmitting the pump laser beam and reflecting an amplified laser beam;
      rare earth doped dual core optical fiber means for amplifying the pump laser beam to thereby produce said amplified laser beam;
      polarization controller means for controlling polarization of said amplified laser beam;
      polarization selector means for selecting said polarization of said amplified laser beam;
      frequency doubling means for converting said amplified laser beam into a frequency doubled laser beam; and
      second dichroic reflector means for transmitting said frequency doubled laser beam and reflecting said amplified laser beam.

26. A frequency doubled polarization controlled laser system receiving a pump laser beam, comprising:
   a long laser cavity which suppresses output power fluctuations, said long laser cavity, including:
      first dichroic reflector means for transmitting the pump laser beam and reflecting an amplified laser beam;
      polarizing rare earth doped optical fiber means comprising first means for amplifying the pump laser beam to thereby produce said amplified laser beam, second means for controlling polarization of said amplified laser beam, and third means for selecting said polarization of said amplified laser beam;
      frequency doubling means for converting said amplified laser beam into a frequency doubled laser beam; and
      second dichroic reflector means for transmitting said frequency doubled laser beam and reflecting said amplified laser beam.

27. A method for generating a frequency doubled polarization controlled laser beam responsive to a pump laser beam in a laser system having a long laser cavity which suppresses output power fluctuations and including at least one rare-earth doped dual core optical fiber producing a gain, the method comprising steps for:
   selectively transmitting the pump laser beam into a first end of the long laser cavity while reflecting an amplified laser beam at said first end of the long laser cavity;
   amplifying the pump laser beam to thereby produce said amplified laser beam;

selecting a polarization characteristic of said amplified laser beam and controlling the polarization state of said amplified laser beam to thereby provide a polarization controlled laser beam;

converting said polarization controlled laser beam into a frequency doubled laser beam; and selectively transmitting said frequency doubled laser beam out of a second end of the long laser cavity while reflecting said polarization controlled laser beam at the second end of the long laser cavity.

28. A method for generating a polarization controlled laser beam responsive to a pump laser beam in a laser system having a long laser cavity which suppresses output power fluctuations and including at least one rare-earth doped dual core optical fiber producing a gain, the method comprising steps for:

selectively transmitting the pump laser beam into a first end of the long laser cavity while reflecting an amplified laser beam at said first end of the long laser cavity;

amplifying the pump laser beam to thereby produce said amplified laser beam;

selecting a polarization characteristic of said amplified laser beam and controlling the polarization state of said amplified laser beam to thereby provide a polarization controlled laser beam; and selectively transmitting said polarization controlled laser beam out of a second end of the long laser cavity while reflecting said amplified laser beam at the second end of the long laser cavity.

* * * * *